United States Patent
Gottlib et al.

(10) Patent No.: US 10,205,665 B2
(45) Date of Patent: *Feb. 12, 2019

(54) MESH NETWORK NODES CONFIGURED TO ALLEVIATE CONGESTION IN CELLULAR NETWORK

(71) Applicant: SILVER SPRING NETWORKS, INC., San Jose, CA (US)

(72) Inventors: Elad Gottlib, San Ramon, CA (US); Dorothy Gellert, Mountain View, CA (US)

(73) Assignee: ITRON NETWORKED SOLUTIONS, INC., Liberty Lake, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/820,950

(22) Filed: Nov. 22, 2017

(65) Prior Publication Data

US 2018/0097732 A1    Apr. 5, 2018

Related U.S. Application Data

(63) Continuation of application No. 14/426,435, filed as application No. PCT/US2014/054878 on Sep. 10, 2014.

(Continued)

(51) Int. Cl.
| | |
|---|---|
| *H04W 28/02* | (2009.01) |
| *H04W 84/04* | (2009.01) |
| *H04L 12/801* | (2013.01) |
| *H04W 4/70* | (2018.01) |

(Continued)

(52) U.S. Cl.
CPC ............ *H04L 47/12* (2013.01); *H04L 45/123* (2013.01); *H04L 47/14* (2013.01); *H04L 47/24* (2013.01);

(Continued)

(58) Field of Classification Search
None
See application file for complete search history.

(56) References Cited

U.S. PATENT DOCUMENTS

| | | |
|---|---|---|
| 2004/0009751 A1 | 1/2004 | Michaelis et al. |
| 2005/0266826 A1 | 12/2005 | Vlad |

(Continued)

FOREIGN PATENT DOCUMENTS

| | | |
|---|---|---|
| CN | 101895951 A | 11/2010 |
| WO | WO 02-058395 A2 | 7/2002 |
| WO | WO 2009-118023 A1 | 10/2009 |

OTHER PUBLICATIONS

International Search Report (PCT/ISA/210) dated Dec. 4, 2014, by the United States Patent Office as the International Searching Authority for International Application No. PCT/US2014/054878.

(Continued)

*Primary Examiner* — Charles N Appiah
*Assistant Examiner* — Franke E Donado
(74) *Attorney, Agent, or Firm* — Buchanan Ingersoll & Rooney PC

(57) ABSTRACT

A plurality of nodes in a first network mitigate data restrictions on access points which are an interface between the first network and a second network. The access points advertise their access parameters to the second network to the nodes. The nodes maintain a list of the advertised access parameters of each access point. The nodes determine whether to transmit data to the second network according to a first transmission mode or a second transmission mode based on the data to be transmitted and the list of access parameters maintained by that node. In the first transmission mode, the node determines to transmit the data to a first access point having a lowest cost with that node. In the second transmission mode, the node determines to transmit (Continued)

the data to a second access point having fewer access restrictions to the second network than the first access point.

17 Claims, 4 Drawing Sheets

Related U.S. Application Data

(60) Provisional application No. 61/875,762, filed on Sep. 10, 2013.

(51) Int. Cl.
*H04L 12/721* (2013.01)
*H04L 12/851* (2013.01)
*H04W 48/02* (2009.01)

(52) U.S. Cl.
CPC ......... *H04W 4/70* (2018.02); *H04W 28/0215* (2013.01); *H04W 48/02* (2013.01); *H04W 84/04* (2013.01); *Y02B 90/246* (2013.01); *Y04S 20/42* (2013.01)

(56) References Cited

U.S. PATENT DOCUMENTS

| | | | |
|---|---|---|---|
| 2006/0030265 A1 | 2/2006 | Desai et al. | |
| 2007/0110084 A1* | 5/2007 | Bennett | H04W 40/36 370/401 |
| 2007/0280192 A1* | 12/2007 | Yagyu | H04L 12/4625 370/349 |
| 2008/0095041 A1 | 4/2008 | Charzinski | |
| 2008/0144497 A1 | 6/2008 | Ramprashad et al. | |
| 2009/0093232 A1 | 4/2009 | Gupta et al. | |
| 2010/0246386 A1 | 9/2010 | Erceg et al. | |
| 2010/0318661 A1 | 12/2010 | Heurguier | |
| 2012/0036250 A1* | 2/2012 | Vaswani | G01D 4/004 709/224 |
| 2012/0129533 A1* | 5/2012 | Karaoguz | H04L 29/06027 455/437 |
| 2014/0003254 A1* | 1/2014 | Andreoli-Fang | H04W 28/02 370/252 |

OTHER PUBLICATIONS

Written Opinion (PCT/ISA/237) dated Dec. 4, 2014, by the United States Patent Office as the International Searching Authority for International Application No. PCT/US2014/054878.

European Search Report dated May 18, 2015 in corresponding European Application No. 14843304.8. (3 pages).

Office Action (Notification of the First Office Action) dated May 3, 2017, by the State Intellectual Property Office of the People's Republic of China in corresponding Chinese Patent Application No. 201480002649.5 and an English Translation of the Office Action. (10 pages).

* cited by examiner

MESH NETWORK NODES CONFIGURED TO ALLEVIATE CONGESTION IN CELLULAR NETWORK

RELATED APPLICATIONS

The present application is a continuation of U.S. Non-Provisional Application No. 14/426,435, filed on Mar. 6, 2015, which is a U.S. national phase application of International Application No. PCT/US2014/054878, filed on Sep. 10, 2014, which claims priority to U.S. Provisional Application No. 61/875,762, filed on Sep. 10, 2013. The entire contents of these earlier applications are hereby incorporated by reference in their entirety.

FIELD

The present disclosure relates to a system including a mesh network operating in conjunction with a wide area cellular network, to nodes in the mesh network being configured to alleviate congestion in the cellular network, and to a method of avoiding congestion in the cellular network.

BACKGROUND

In view of increasing amounts of machine type communication (MTC) traffic and limited available frequencies, cellular network providers (hereinafter "cellular providers") have implemented congestion mitigation techniques such as (i) access class barring, (ii) extended access barring, and (iii) low access priority indications to prevent or limit a cellular-enabled end point device from accessing the cellular network to transport data. In some cases, the connection to the cellular network might be available but not optimal to the payload of data transmitted by a cellular-enabled end point device due to a lower bandwidth connection or a high latency connection when the payload requires a high data rate or lower latency, or both. In either case, the connection issues to the cellular networks could be specific to a cellular-enabled end point device.

A mesh network is a network topology in which nodes of the network can relay data for other nodes of the network. An example of a wireless mesh network is an advanced meter infrastructure (AMI) system for collecting data from utility meters (e.g., electricity, gas, water, etc.), reporting the collected data to a utility, and communicating data between the meters and utility. In such an AMI system, the meters may transmit data to access points (also referred to as gateways) which serve as an interface between a local area network composed of meter nodes, and a separate network through which the access point(s) is/are connected to a back office or central station of the utility. The access points may communicate with the back office using a cellular network. The use of such cellular networks may be restricted according to data usage policies designated by the cellular providers. For example, the cellular provider of a particular cellular network may restrict one or more of the access points to an individual monthly data limit. The access points can utilize different cellular providers, each of which can impose different data restrictions.

SUMMARY

An exemplary embodiment of the present disclosure provides a system which includes a plurality of nodes connected in a first wireless network, and a plurality of access points connected to the first wireless network and to at least one second wireless network distinct from the first wireless network. The plurality of access points each respectively constitute an interface between the first wireless network and the at least one second wireless network. Each of the access points is configured to advertise its access parameters to the at least one second wireless network to the nodes in the first wireless network. The access parameters include an indication of access restrictions the corresponding access point currently has to the at least one second wireless network. Each of the nodes is configured to maintain a list of the access parameters of each access point in the first wireless network based on the advertised access parameters respectively transmitted from the access points. Each of the nodes is configured to determine whether data is to be transmitted to the second wireless network according to one of a first transmission mode and a second transmission mode based on the data to be transmitted and the list of access parameters maintained by that node. In the first transmission mode, the node is configured to determine to transmit the data to a first one of the access points having a lowest cost between the node and the first one of the access points. In the second transmission mode, the node is configured to determine to transmit the data to a second one of the access points having fewer access restrictions to the second wireless network than the first one of the access points.

An exemplary embodiment of the present disclosure provides a method of mitigating data restrictions for a plurality of nodes connected in a first wireless network. A plurality of access points are connected to the first wireless network and to at least one second wireless network distinct from the first wireless network. The plurality of access points each respectively constitute an interface between the first wireless network and the at least one second wireless network. The method includes advertising, by the access points, access parameters to the at least one second wireless network to the nodes in the first wireless network, the access parameters including an indication of access restrictions the corresponding access point currently has to the at least one second wireless network, respectively. The exemplary method includes maintaining, by the nodes in the first wireless network, a list of the access parameters of each access point in the first wireless network based on the advertised access parameters respectively transmitted from the access points. The exemplary method also includes determining, by at least one of the nodes in the first wireless network, whether data is to be transmitted to the second wireless network according to one of a first transmission mode and a second transmission mode based on the data to be transmitted and the list of access parameters maintained by that node. In the first transmission mode, the at least one node determines to transmit the data to a first one of the access points having a lowest cost between the node and the first one of the access points. In the second transmission mode, the at least one node determines to transmit the data to a second one of the access points having fewer access restrictions to the second wireless network than the first one of the access points.

An exemplary embodiment of the present disclosure provides a non-transitory computer-readable recording medium having a program tangibly stored thereon that, when executed by a processor of at least one node connected in a first wireless network, causes the at least one node to execute a method of mitigating data restrictions encountered by at least one access point among a plurality of access points connected to the first wireless network and to at least one second wireless network distinct from the first wireless network, the plurality of access points each respectively constituting an interface between the first wireless network and the at least one second wireless network. The method includes receiving, from the access points, advertised access parameters to the at least one second wireless network to the nodes in the first wireless network, the access parameters including an indication of access restrictions the corresponding access point currently has to the at least one second wireless network, respectively. The method also includes maintaining a list of the access parameters of each access point in the first wireless network based on the advertised access parameters respectively transmitted from the access points. In addition, the method includes determining whether data is to be transmitted to the second wireless network according to one of a first transmission mode and a second transmission mode based on the data to be transmitted and the list of access parameters maintained by the at least one node. In the first transmission mode, the method includes determining to transmit the data to a first one of the access points having a lowest cost between the node and the first one of the access points. In the second transmission mode, the method includes determining to transmit the data to a second one of the access points having fewer access restrictions to the second wireless network than the first one of the access points.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a system and method for overcoming data restrictions in a cellular network by nodes of a mesh network connected to the cellular network determining whether to utilize other nodes in the mesh network to transport data to the cellular network.

Figure 1:
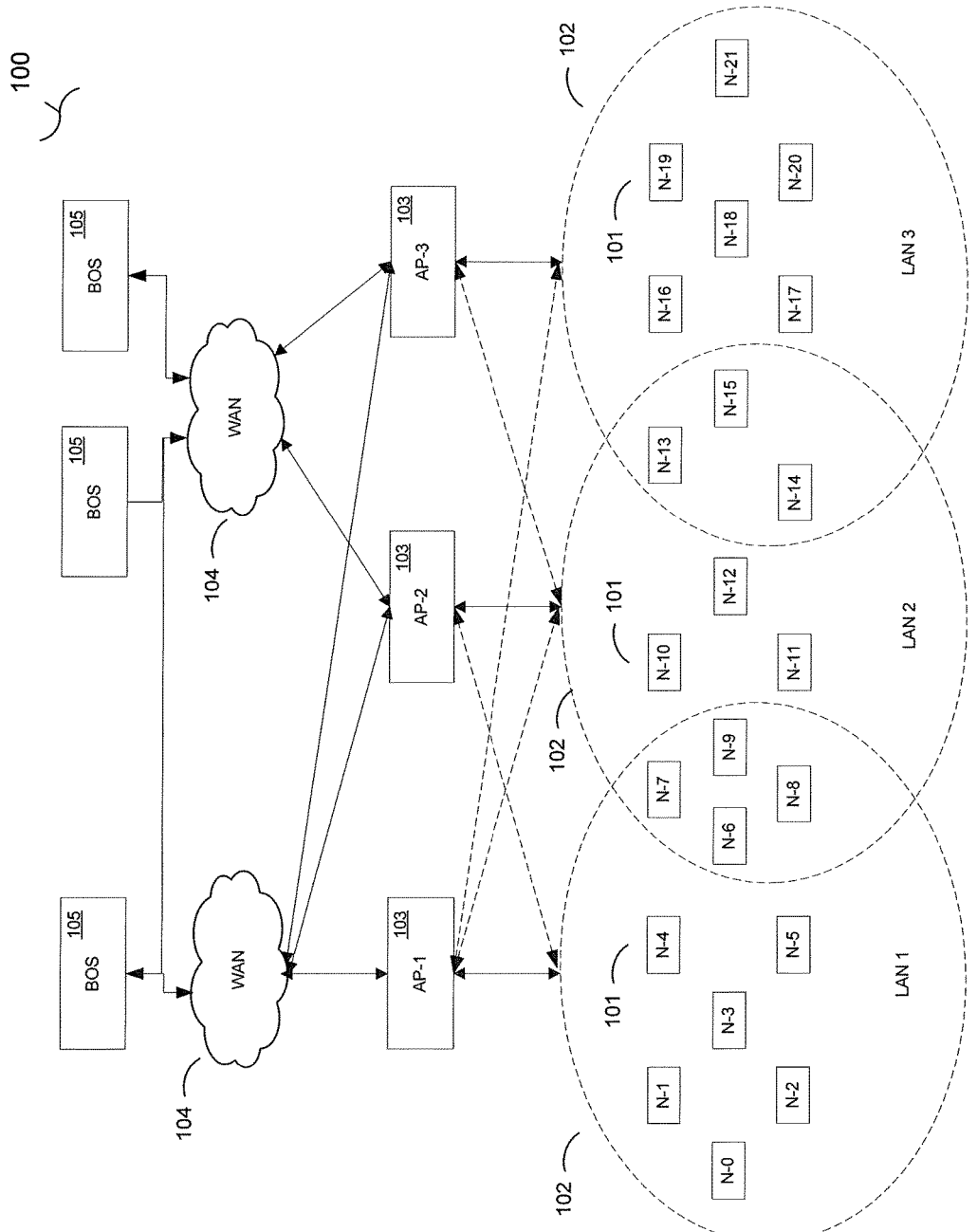
FIG. 1 is a diagram of a system including a mesh network configured for communicating with a cellular network, according to an exemplary embodiment of the present disclosure.

FIG. 1 is a diagram of a system 100 including a mesh network configured for communicating with a cellular network, in accordance with an exemplary embodiment of the present disclosure. In FIG. 1, a plurality of nodes 101 are arranged in one or more local area networks (LAN) 102. In the example of FIG. 1, nodes N-1 to N-9 are arranged in LAN 1, nodes N-7 to N-15 are arranged in LAN 2, and nodes N-13 to N-21 are arranged in LAN 3. As illustrated, some of the nodes can be members of more than one LAN. For instance, nodes N-7 to N-9 are members of LAN 1 and LAN 2, and nodes N-13 to N-15 are members of LAN 2 and LAN 3. The LANs 102 illustrated in FIG. 1 are each respectively an example of a first wireless network as used herein.

The nodes 101 are each connected to one more access points (AP) 103 which are interfaces between the LANs 102 and a wide area network (WAN) 104. In accordance with an exemplary embodiment of the present disclosure, the WAN 104 is a cellular network managed by at least one cellular network provider. In the example of FIG. 1, the WAN 104 is a cellular network managed by one cellular network provider. The present disclosure is not limited thereto, as will be discussed below. The APs 103 may be connected to one or more back office stations (BOS) or servers 105 via the WAN 104. The BOS 105 can function to distribute commands to the APs 103 and/or nodes 101, and to receive data from the nodes 101 and/or APs 103 via the WAN 104.

Each of the nodes 101 is configured to discover other nodes 101 and APs 103 in the mesh network by listening to all neighbors with which it can set up links. The nodes 101 may then construct a routing table with an ordered list of next hops and corresponding path costs (advertised cost of egress by the next hop). The nodes 101 may register with their upstream nodes as well as the APs 103. By registering with the APs 103, the nodes 101 can obtain a respectively unique network address for each AP with which the nodes 101 register. For example, node N-5 can register with AP-1 and AP-2 to obtain two respectively unique network addresses, one based on the registration with AP-1 and another based on the registration with AP-2. Node N-5's addresses can, for example, be based on a prefix respectively associated with the individual APs and a unique identifier (e.g., MAC address) of the node. For example, node N-5 can have a first address based on a prefix associated with AP-1 and the unique identifier of node N-5, and a second address based on a prefix associated with AP-2 and the unique identifier of node N-5. The nodes 101 can register their address(es) with upstream nodes 101 as well as the APs 103 and BOS 105. A node have multiple addresses provides multiple routes to reach that node. In the above example of node N-5 having two unique addresses, the BOS 105 can transmit commands or data to node N-5 through the WAN 104 via AP-1 or via AP-2.

Figure 2:
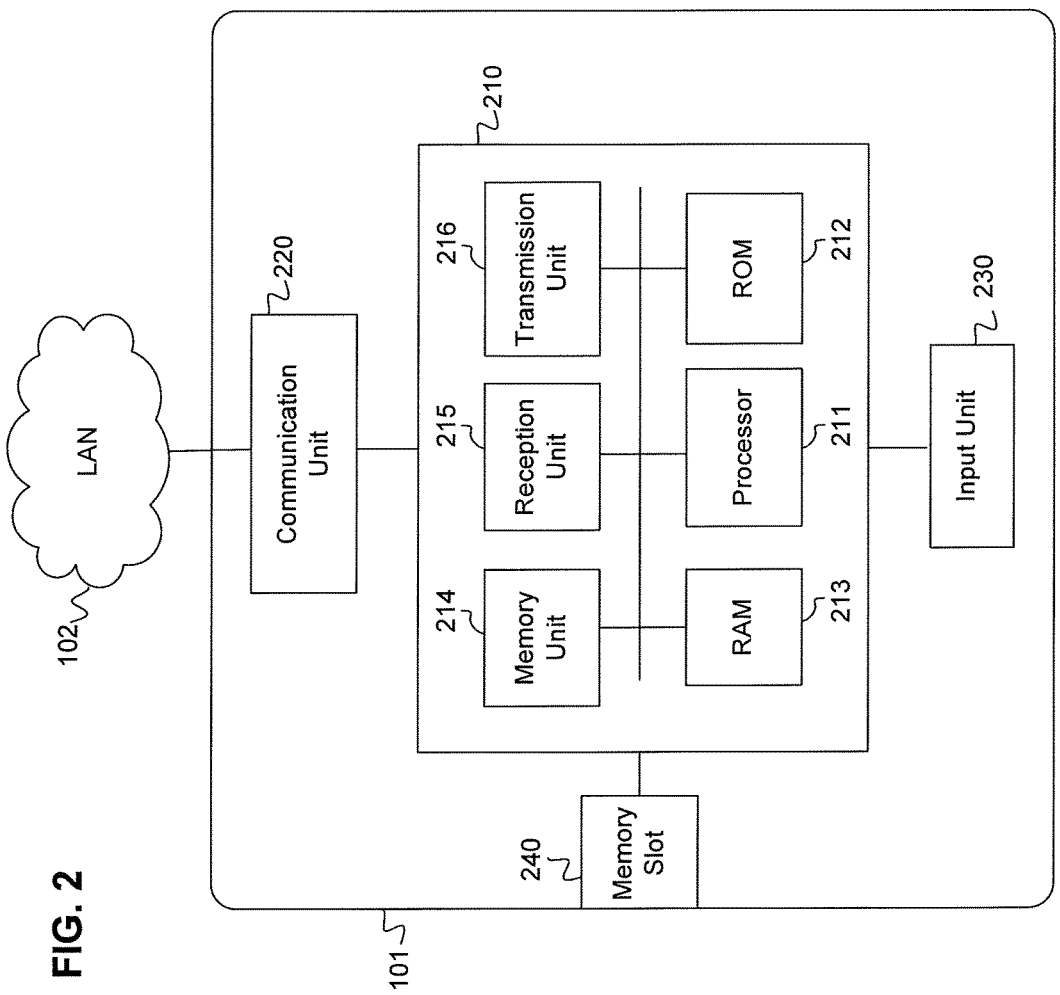
FIG. 2 is a block diagram of a node in the mesh network according to an exemplary embodiment of the present disclosure.

FIG. 2 is a block diagram of an exemplary embodiment of a node 101 in the mesh network. As shown in FIG. 2, the node 101 includes a processing unit 210, a communication unit 220, an input unit 230, and a memory slot 240. The processing unit 210 includes a processor 211, a read-only memory (ROM) 212, a random access memory (RAM) 213, a memory unit 214, a reception unit 215, and a transmission unit 216. The processor 211 controls the aggregate functions of each component of the node 101. The processor 211 may include a general-purpose processor such as an ARM, Intel or AMD processor, and/or an Application-Specific Integrated Circuit (ASIC). The ROM 212 stores programs, such as an operating system and computer-readable application programs, and logic instructions which are executed by the processor 211. The memory unit 214 is a non-volatile memory which can also record computer-readable application programs to be executed by the processor 211. The memory slot 240 is configured to receive a removable non-volatile memory card and/or disc inserted therein, such as a CD-ROM, DVD-ROM, BD-ROM, flash memory, optical memory, etc. The memory slot 240 communicatively couples terminals of the removable memory card/disc to the processing unit 210 to provide the components of the processing unit 210 access to data and application programs recorded on the memory card/disc, and to store data thereon. The RAM 213 is used as a working memory by the processor 211 when executing the programs and logic instructions recorded in the ROM 212, memory unit 214 and/or memory card/disc inserted into the memory slot 240. The ROM 212, memory unit 214 and memory card/disc inserted into the memory slot 240 are examples of a non-transitory computer-readable recording medium on which an operating system and/or application programs of the node 101 can be recorded and executed by the processor 211. The processor 211 is configured to communicate with any of these computer-readable recording media and thus is communicatively connected to these computer-readable media.

The reception unit 215 receives data from the communication unit 220 and forwards the received data to the processor 211 for appropriate processing. The transmission unit 216 receives data that is instructed to be sent to the communication unit 220 by the processor 211, and transmits the instructed data to the communication unit 220.

The communication unit 220 is an interface (e.g., transceiver) between the node 101 and other nodes 101 and/or one or more of the APs 103 in the network(s) 102. The communication unit 220 can transmit data to one or more nodes as individual messages, a multicast message or a broadcast message. The communication unit 220 also receives data and/or instructions from other nodes 102 and/or APs 103. Received data and/or instructions are forwarded to the processor 211 by the reception unit 215.

The input unit 230 can include keys and pointing devices that can be manipulated by an operator of the node 101. For example, the input unit 230 can include a QWERTY keyboard, a trackball or similar selecting and pointing device, a number pad, etc. The input unit 230 can include a display device configured to visually display an input received by such keys and/or pointing devices. The input unit 230 can also include a multi-input touch screen with a virtual keyboard and buttons represented in a graphical user interface (GUI). Operating instructions received by the input unit 230 are forwarded to the processor unit 211.

The APs 103 illustrated in FIG. 1 can have a similar hardware construction as the nodes 101 as illustrated in FIG. 2. It is to be understood, however, that the corresponding communication unit of the APs 103 is configured to communicate with both the LAN(s) 102 and the WAN(s) 104. The communication unit of the APs 103 can be embodied as a single transceiver configured to communicate with both the LAN(s) 102 and the WAN(s) 104. Alternatively, the communication unit of the APs 103 can be embodied as separate transceivers each respectively configured to communicate with either the LAN(s) 102 or the WAN(s) 104.

As noted above, due to increasing amounts of machine type communication (MTC) traffic and limited available frequencies, cellular providers have implemented congestion mitigation techniques such as (i) access class barring, (ii) extended access barring, and (iii) low access priority indications to prevent or limit a cellular-enabled end point device from accessing the cellular network to transport data. In some cases, the connection to the cellular network 104 might be available but not optimal to the payload of data transmitted by the nodes 101 due to a lower bandwidth connection or a high latency connection when the payload requires a high data rate or lower latency, or both. In either case, the connection issues to the cellular network(s) could be specific to a specific one of the APs 103 or they can be applicable to more than one of the APs 103.

Due to such restrictions in the WAN(s) 104, the present disclosure provides that the nodes 101 can each determine whether data to be transmitted to the WAN(s) 104 should be transmitted according to a first transmission mode or a second transmission mode. The nodes 101 can make this determination based on current network conditions in the WAN(s) 104 and the data to be transmitted to the WAN(s) 104.

To assist the nodes 101 in this determination, each of the APs 103 is configured to periodically advertise its own access parameters to the WAN 104 to the nodes 101 in the LANs 102. For example, the APs 103 can broadcast their access parameters at regular intervals, and/or the APs 103 can provide an update of their access parameters when communicating with a particular node (e.g., by an acknowledgment message). The access parameters of the APs 103 include an indication of access restrictions the corresponding access point currently has to the WAN 104. For example, the access parameters can include an indication of whether the corresponding AP 103 has been subjected to (i) access class barring, (ii) extended access barring, (iii) low access priority, (iv) approaching or exceeding a periodic data transfer allowance, as well as other restrictions imposed by the cellular provider.

Each of the nodes 101 is configured to maintain a list of the access parameters of each AP 103 connected to the LANs 102 based on the advertised access parameters respectively transmitted from the APs 103. For instance, in the example of FIG. 1, node N-11 is configured to keep a list of the respective access parameters of AP-1, AP-2 and AP-3. The nodes 101 can update their lists of the APs' access parameters upon receiving an update from the APs 103 (e.g., via a broadcast message), and/or by receiving updated information about one or more of the APs 103 from a neighboring node.

Each of the nodes 101 is configured to determine whether data is to be transmitted to the WAN(s) 104 according to either the first transmission mode or the second transmission mode based on the data to be transmitted and the list of access parameters maintained by that node 101. Thus, the nodes 101 make the determination of whether to circumvent any data restrictions in the WAN(s) 104 based on two criteria, the data itself and the information on access restrictions provided by the APs 103.

In the first transmission mode, the nodes 101 determine to transmit the data to one of the APs 103 having a lowest cost (e.g., path cost) between that node 102 and the AP 103. For example, in the first transmission mode, node N-3 can determine to transmit data to the WAN 104 via AP-1 103. The nodes 101 can make this determination, for example, if it is not important that the type of data reaches its intended destination by a specific time. In the first transmission mode, the nodes 101 can determine that the data to be transmitted can be delayed if there are currently restrictions in the cellular network 104. Of course, if none of the APs 103 is currently experiencing any data restrictions in the cellular network 104, then the nodes 101 would determine to transmit the data according to the first transmission mode since the data would be transmitted to the AP 103 having the lowest cost.

On the other hand, in the second transmission mode, the nodes 101 are configured to determine to transmit the data to another one of the APs 103 having fewer access restrictions to the WAN(s) 104 than the AP 103 having the lowest cost with that node 101. In the above example concerning the first transmission mode, it was described that node N-3 can determine to transmit data to the WAN 104 via AP-1 103. Consistent with this example, in the second transmission mode, node N-3 may determine to transmit data to the WAN 104 via AP-3 if AP-3 has fewer access restrictions to the WAN 104 than AP-1. Node N-3 can transmit the data to AP-3 by forwarding the data via intermediary nodes connected with AP-3. Alternatively, if the APs 103 are communicatively connected to each other, AP-1 can forward the data received from node N-3 to AP-3, either directly or via intermediary AP-2.

Accordingly, the present disclosure provides that the nodes 101 can determine whether they want to access a more favored cellular-enabled AP 103 and send the data through it, if the AP 103 having the lowest cost with the node 101 is currently experiencing data restrictions with the cellular network 104. In addition, based on the lists of AP access restrictions maintained by each node 101 and the type of data the node 101 desires to send, the node 101 can determine to wait to transmit the data until the cellular connection with the least-cost AP 103 improves.

Figure 3:
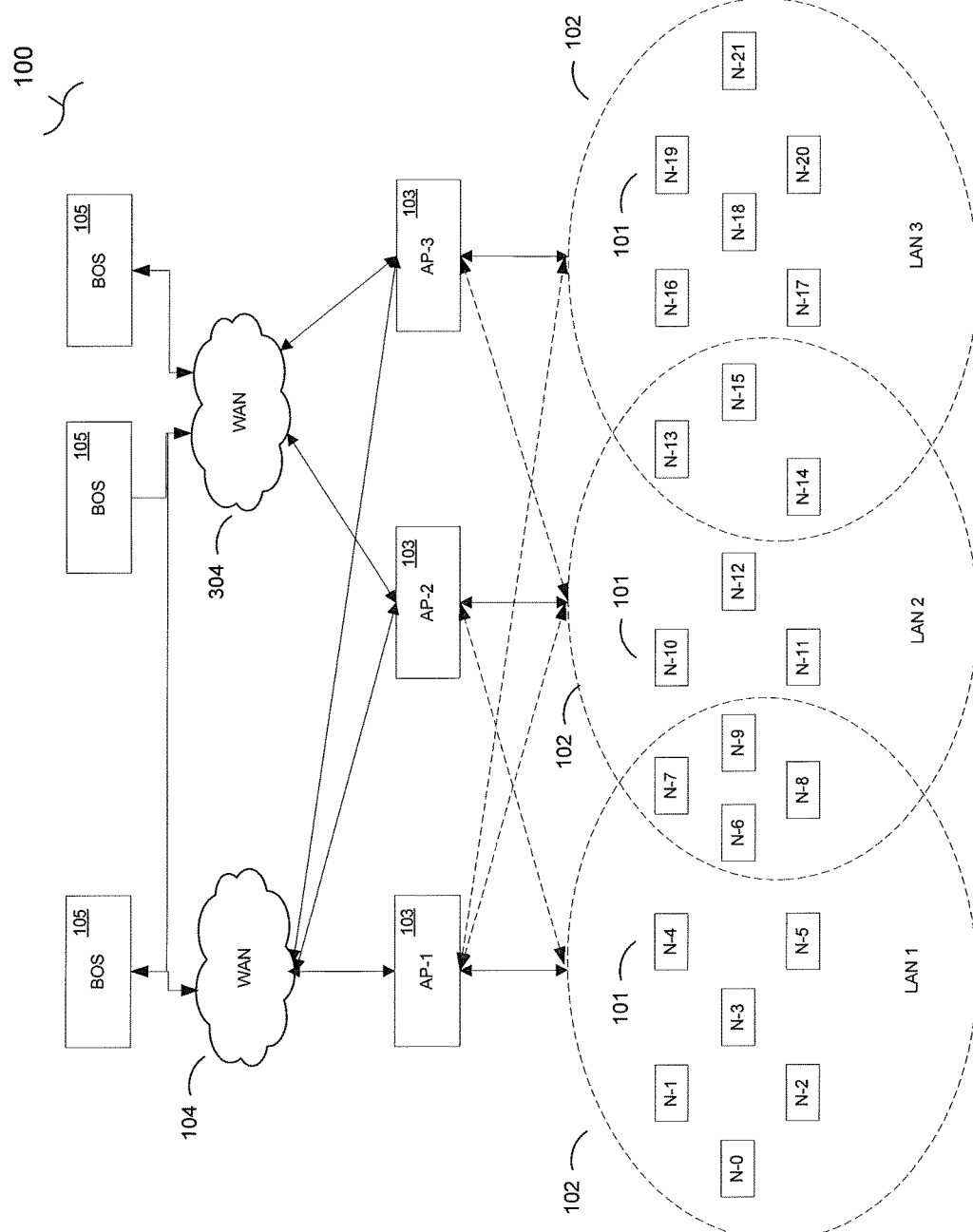
FIG. 3 is a diagram of a system including a mesh network configured for communicating with a cellular network, according to an exemplary embodiment of the present disclosure.

FIG. 1 illustrates an example where one cellular provider provides the cellular network for APs-1 to AP-3. The present disclosure is not limited thereto. Different cellular providers can provide different or overlapping cellular networks to different APs 103. FIG. 3 illustrates such an example, where WAN 104 denotes a first cellular network (e.g., a CDMA network) provided by a first cellular provider, and WAN 304 denotes a second cellular network (e.g., a GSM network), which is different from the first cellular network and provided by a second cellular provider different from the first cellular provider.

In the example of FIG. 3, if node N-3, for example, receives access parameters from the APs 103 in which AP-1 has a connection rejection, a wait time or an indication that AP-1 is currently barred from accessing WAN 104, node N-3 can determine to forward its data to AP-3 which does not currently have such restrictions. The nodes can make this decision for all traffic or based on a priority of the payload or the latency requirement of the payload, for example.

The present disclosure also provides that one of the APs may be configured as a low priority access device, where the cellular network (e.g., network 304) can require that the AP-3 delay access for a period of time. In this case, nodes which may have a lower cost with AP-3 may determine to forward their data to another AP (e.g., AP-1) while AP-3 is designated as a low priority access device.

In accordance with another exemplary embodiment, if one of the nodes 101 determines that the latency through the cellular network is too high depending on the type of payload, the node having the latency constraint can determine if a more favorable path to either one of the cellular networks 104, 304 can be achieved through the mesh network 102 and forward its data to another one of the nodes 101 or APs in the mesh network that currently has better access to the cellular network(s) 104, 304. Similarly, if one of the nodes determines that the data rate available in one of the cellular networks 104, 304 is too low to service the payload in time, that node can forward its data to another node in the mesh network to service the payload in time.

In the above-described exemplary embodiments, it was described that the nodes 101 can make the determination whether to utilize another AP than the AP with which the node has a lowest cost. In addition, the APs can similarly determine to utilize alternative transmission paths through other APs if other APs in the mesh network provide a preferred data transfer through one or more of the cellular networks 104, 304.

Figure 4:
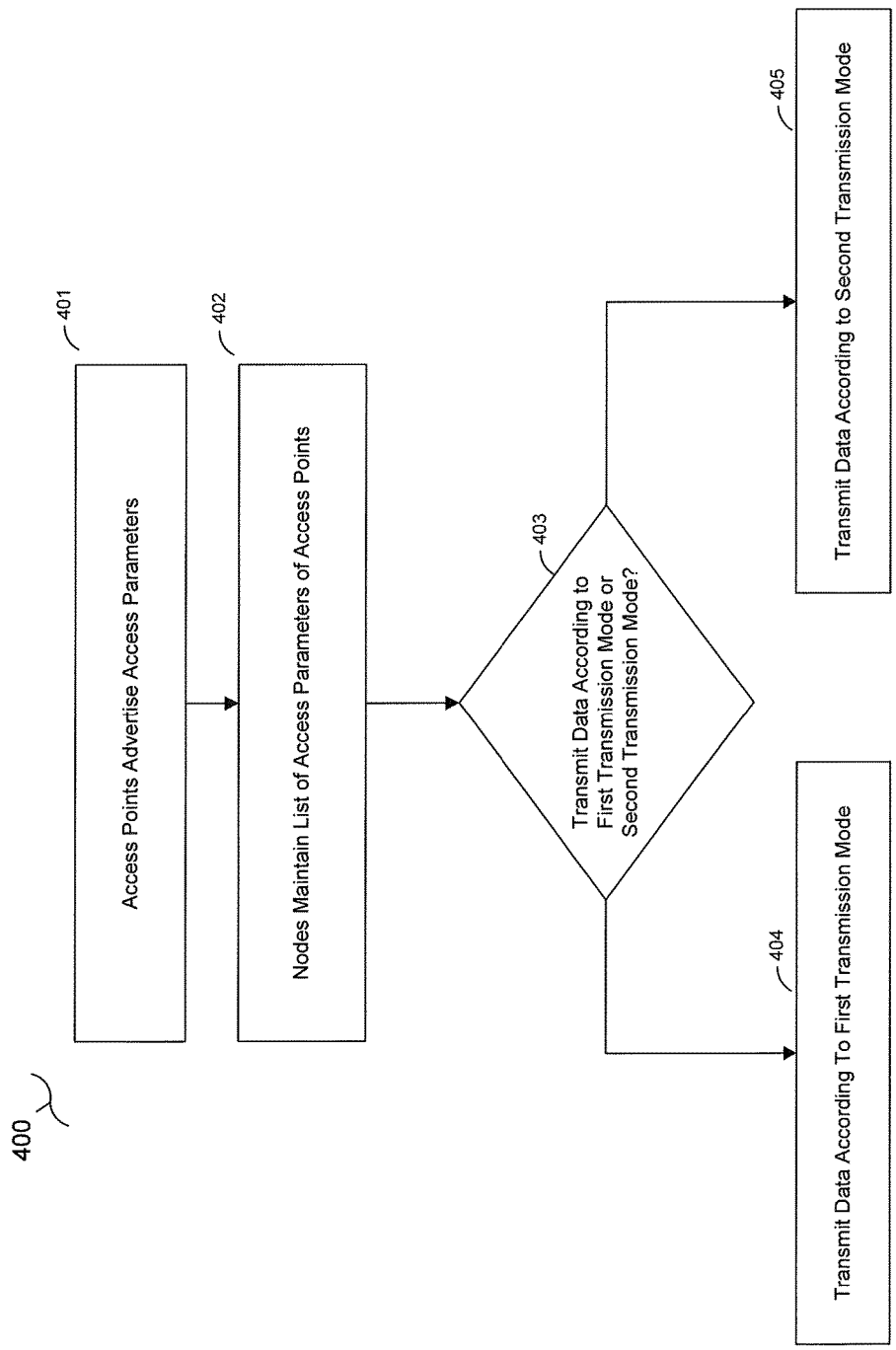
FIG. 4 is a flowchart diagram illustrating a method according to an exemplary embodiment of the present disclosure.

FIG. 4 illustrates a method of mitigating data restrictions in a cellular network, in accordance with the exemplary embodiments described above. The method includes advertising, by the access points, access parameters to the at least one second wireless network to the nodes in the first wireless network, the access parameters including an indication of access restrictions the corresponding access point currently has to the at least one second wireless network (step 401). The method also includes maintaining, by the nodes in the first wireless network, a list of the access parameters of each access point in the first wireless network based on the advertised access parameters respectively transmitted from the access points (step 402). The method includes determining, by at least one of the nodes in the first wireless network, whether data is to be transmitted to the second wireless network according to one of a first transmission mode and a second transmission mode based on the data to be transmitted and the list of access parameters maintained by that node (step 403). In the first transmission mode, the at least one node determines to transmit the data to a first one of the access points having a lowest cost between the node and the first one of the access points (step 404). In the second transmission mode, the at least one node determines to transmit the data to a second one of the access points having fewer access restrictions to the second wireless network than the first one of the access points (step 405).

In accordance with the exemplary embodiments described above, the present disclosure also provides a non-transitory computer-readable recording medium (e.g., ROM 212, memory unit 214 in FIG. 2) having a program tangibly stored thereon that, when executed by a processor (e.g., processor 211 in FIG. 2) of at least one node 101 connected in a first wireless network (e.g., LAN 102), causes the at least one node 101 to execute a method of mitigating data restrictions encountered by at least one access point 103 among a plurality of access points 103 connected to the first wireless network 102 and to at least one second wireless network (e.g., WAN 104) distinct from the first wireless network 102, where the plurality of access points 103 each respectively constitute an interface between the first wireless network 102 and the at least one second wireless network 104. The method performed by the anode 101 includes the operative features of the exemplary embodiments described above.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practising the claimed disclosure, from a study of the drawings, the present disclosure, and the appended claims. In the claims, the word "comprising" or "including" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system comprising:
a plurality of nodes connected in a first wireless network;
at least two access points, each of said two access points being connected to the first wireless network and to at least one second wireless network distinct from the first wireless network, each of the two access points each thereby constituting an interface between the first wireless network and the at least one second wireless network, wherein:
each of the two access points is configured to advertise, to the nodes in the first wireless network, its parameters for accessing the at least one second wireless network, the access parameters including an indication of access restrictions the corresponding access point currently has to the at least one second wireless network, and current network conditions in the at least one second wireless network;
each of the nodes is configured to maintain a list of the access parameters including an indication of access restrictions of each access point in the first wireless network to the at least one second wireless network based on the advertised access parameters respectively transmitted from the access points;
each of the nodes is configured to determine whether data is to be transmitted to the second wireless network according to one of a first transmission mode and a second transmission mode based on the data to be transmitted, the list of access parameters maintained by that node, and the current network conditions in the at least one second network;
in the first transmission mode, the node is configured to determine to transmit the data to a first one of the access points having a lowest cost between the node and the first one of the access points; and
in the second transmission mode, the node is configured to determine to transmit the data to a second one of the access points having fewer access restrictions to the second wireless network than the first one of the access points, based on the maintained list of access parameters of each access point to the at least one second wireless network.

2. The system of claim 1, wherein each of the nodes is configured to determine whether data is to be transmitted to the second wireless network according to one of the first transmission node and the second transmission mode based on a priority of a payload of the data to be transmitted.

3. The system of claim 1, wherein each of the nodes is configured to determine whether data is to be transmitted to the second wireless network according to one of the first transmission mode and the second transmission mode based on the content of a payload of the data to be transmitted.

4. The system of claim 1, wherein each of the nodes is configured to determine whether data is to be transmitted to the second wireless network according to one of the first transmission mode and the second transmission mode based on a latency requirement of a payload of the data to be transmitted.

5. The system of claim 1, wherein the access parameters of the access points respectively comprise information including at least one of: (i) whether the corresponding access point is subject to access class barring, (ii) whether the corresponding access point is subject to extended access barring, (iii) whether the corresponding access point is designated to have low access priority, and (iv) whether the corresponding access point is approaching or has exceeded a periodic data transfer allowance.

6. The system of claim 1, wherein the cost between the node and the first one of the access points is a path cost to the first one of the access points, and
wherein the path cost from the node to the first one of the access points is an aggregated cost of egress to each hop along a path from the node to the first one of the access points.

7. A method of mitigating data restrictions for a plurality of nodes connected in a first wireless network, wherein at least two access points are connected to the first wireless network and to at least one second wireless network distinct from the first wireless network, each of the two access points thereby constituting an interface between the first wireless network and the at least one second wireless network, the method comprising:
advertising to the nodes in the first wireless network, by the access points, respective parameters for accessing the at least one second wireless network, the access parameters including an indication of access restrictions the corresponding access point currently has to the at least one second wireless network, and current network conditions in the at least one second wireless network;
maintaining, by the nodes in the first wireless network, a list of the access parameters including an indication of access restrictions of each access point in the first wireless network to the at least one second wireless network based on the advertised access parameters respectively transmitted from the access points;
determining, by at least one of the nodes in the first wireless network, whether data is to be transmitted to the second wireless network according to one of a first transmission mode and a second transmission mode based on the data to be transmitted, the list of access parameters maintained by that node, and the current network conditions in the at least one second wireless network;
in the first transmission mode, determining, by the at least one node, to transmit the data to a first one of the access points having a lowest cost between the node and the first one of the access points; and
in the second transmission mode, determining, by the at least one node, to transmit the data to a second one of the access points having fewer access restrictions to the second wireless network than the first one of the access points, based on the maintained list of access parameters of each access point to the at least one second wireless network.

8. The method of claim 7, comprising:
determining, by the at least one of the nodes, whether data is to be transmitted to the second wireless network according to one of the first transmission mode and the second transmission mode based on a priority of a payload of the data to be transmitted.

9. The method of claim 7, comprising:
determining, by the at least one of the nodes, whether data is to be transmitted to the second wireless network according to one of the first transmission mode and the second transmission mode based on the content of a payload of the data to be transmitted.

10. The method of claim 7, comprising:
determining, by the at least one of the nodes, whether data is to be transmitted to the second wireless network according to one of the first transmission mode and the second transmission mode based on a latency requirement of a payload of the data to be transmitted.

11. The method of claim 7, wherein the access parameters of the access points respectively comprise information including at least one of: (i) whether the corresponding access point is subject to access class barring, (ii) whether the corresponding access point is subject to extended access barring, (iii) whether the corresponding access point is designated to have low access priority, and (iv) whether the corresponding access point is approaching or has exceeded a periodic data transfer allowance.

12. The method of claim 7, wherein the cost between the node and the first one of the access points is a path cost to the first one of the access points, and wherein the path cost from the node to the first one of the access points is an aggregated cost of egress to each hop along a path from the node to the first one of the access points.

13. A non-transitory computer-readable recording medium having a program tangibly stored thereon that, when executed by a processor of at least one node connected in a first wireless network, causes the at least one node to execute a method of mitigating data restrictions encountered by at least one access point among a plurality of access points each connected to the first wireless network and to at least one second wireless network distinct from the first wireless network, the plurality of access points thereby respectively constituting interfaces between the first wireless network and the at least one second wireless network, the method comprising:

receiving, from the access points, advertised parameters for accessing the at least one second wireless network, the access parameters including an indication of access restrictions the corresponding access point currently has to the at least one second wireless network, respectively, and current network conditions in the at least one second wireless network;

maintaining a list of the access parameters including an indication of access restrictions of each access point in the first wireless network to the at least one second wireless network based on the advertised access parameters respectively transmitted from the access points;

determining whether data is to be transmitted to the second wireless network according to one of a first transmission mode and a second transmission mode based on the data to be transmitted, the list of access parameters maintained by the at least one node, and the current network conditions in the at least one second wireless network;

in the first transmission mode, determining to transmit the data to a first one of the access points having a lowest cost between the node and the first one of the access points; and in the second transmission mode, determining to transmit the data to a second one of the access points having fewer access restrictions to the second wireless network than the first one of the access points, based on the maintained list of access parameters of each access point to the at least one second wireless network.

14. The non-transitory computer-readable recording medium of claim 13, wherein the method comprises:

determining, by the at least one of the nodes, whether data is to be transmitted to the second wireless network according to one of the first transmission mode and the second transmission mode based on a priority of a payload of the data to be transmitted.

15. The non-transitory computer-readable recording medium of claim 13, wherein the method comprises:

determining whether data is to be transmitted to the second wireless network according to one of the first transmission mode and the second transmission mode based on the content of a payload of the data to be transmitted.

16. The non-transitory computer-readable recording medium of claim 13, wherein the method comprises:

determining whether data is to be transmitted to the second wireless network according to one of the first transmission mode and the second transmission mode based on a latency requirement of a payload of the data to be transmitted.

17. The non-transitory computer-readable recording medium of claim 13, wherein the access parameters of the access points respectively comprise information including at least one of: (i) whether the corresponding access point is subject to access class barring, (ii) whether the corresponding access point is subject to extended access barring, (iii) whether the corresponding access point is designated to have low access priority, and (iv) whether the corresponding access point is approaching or has exceeded a periodic data transfer allowance.

* * * * *